United States Patent
Canales-Abarca et al.

(10) Patent No.: US 6,349,044 B1
(45) Date of Patent: Feb. 19, 2002

(54) ZERO VOLTAGE ZERO CURRENT THREE LEVEL DC-DC CONVERTER

(75) Inventors: Francisco Canales-Abarca; Peter M. Barbosa; Fred C. Lee, all of Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/657,782

(22) Filed: Sep. 8, 2000

Related U.S. Application Data

(60) Provisional application No. 60/152,953, filed on Sep. 9, 1999.

(51) Int. Cl.[7] .................... H02M 3/335; H02M 7/538; H02H 7/122
(52) U.S. Cl. .................. 363/17; 363/25; 363/56.05; 363/56.08; 363/134
(58) Field of Search ................ 363/17, 24, 25, 363/56.02, 56.05, 56.07, 56.08, 132, 134

(56) References Cited

U.S. PATENT DOCUMENTS

| | | | | |
|---|---|---|---|---|
| 5,781,419 A | * | 7/1998 | Kutkut et al. | 363/17 |
| 5,808,879 A | * | 9/1998 | Liu et al. | 363/17 |
| 5,999,424 A | * | 12/1999 | Schutten et al. | 363/52 |
| 6,055,161 A | * | 4/2000 | Church et al. | 363/22 |
| 6,064,580 A | * | 5/2000 | Watanabe et al. | 363/17 |
| 6,069,798 A | * | 5/2000 | Liu | 363/16 |
| 6,191,960 B1 | * | 2/2001 | Fraidlin et al. | 363/25 |
| 6,208,529 B1 | * | 3/2001 | Davidson | 363/17 |
| 6,215,683 B1 | * | 4/2001 | Mao | 363/142 |

* cited by examiner

*Primary Examiner*—Bao Q. Vu
(74) *Attorney, Agent, or Firm*—Whitman, Curtis & Christofferson, P.C.

(57) ABSTRACT

A three-level DC-to-DC converter is provided having zero-voltage and zero-current switching (ZVZCS). A flying capacitor is provided on the primary side of the converter to achieve zero voltage switching (ZVS). In addition, during freewheeling (i.e., when no power is being transferred from the primary side to the secondary side), an auxiliary power source is provided to eliminate the circulating energy and to achieve zero current switching (ZCS) for the commutation switches.

10 Claims, 6 Drawing Sheets

ZERO VOLTAGE ZERO CURRENT THREE LEVEL DC-DC CONVERTER

CROSS REFERENCE TO RELATED APPLICATIONS

This application claims priority to U.S. Provisional Application Serial No. 60/152,953, filed on Sep. 9, 1999, the entire contents of which are herein incorporated by reference.

BACKGROUND OF THE INVENTION

1. Field of the Invention

The present invention generally relates to dc-dc converters and, more particularly, to a three-level dc-dc converter which uses an auxiliary voltage source and flying capacitor to reduce the voltage stress across the power switches, improves the efficiency by reducing the circulating energy in the converter, and achieves zero voltage, zero current switching (ZVZCS).

2. Description of the Prior Art

DC-DC power converters are required for many modern day applications. For example, such converters are required for high voltage, high power applications such as used in telecommunications, battery chargers, and uninterruptible power supplies with power factor correction.

The Power Factor Correction (PFC) stage is important stage for the future generation of three phase distributed power systems due to the IEC61000-3-2 Class A standard. The three-phase boost rectifier is an interesting option for this PFC stage, since it can easily comply with the aforementioned standard with simplicity, efficiency, reliability, and low cost. However, in order to reduce the harmonic distortion in this converter, its input to output voltage characteristic has to be increased. Therefore, the dc/dc step down second stage converter usually has to support voltage stress up to 800 Volts, and the need for high voltage devices is required. Unfortunately, these high voltage devices present a poor behavior in terms of conduction and switching losses, and also have a higher cost.

The so-called Zero Voltage Switching (ZVS) Three-Level (TL) dc/dc converters and the Dual Bridge dc/dc converter have overcome this problem. These dc/dc converters reduce the voltage stress across the power switch to half of the input voltage. Hence, power devices with better characteristics can be used. Also, these converters achieve zero voltage switching for the primary switches, which is a necessary characteristic in order to increase the efficiency in the converter.

Examples of three-level ZVS-PWM converters are presented by J. Renes Pinheiro et al., Three Level ZVS PWM Converter A New Concept in DC-to-DC Conversion, IEEE IECON Record, 1992, and J. Renes Pinheiro et al., Wide Load Range Three-Level ZVS-PWM DC-to-DC Converter, IEEE PESC Record, 1993.

FIG. 1 shows a prior art three level ZVS-PWM converter as discussed above. It comprises a main computation leg formed by four MOSFET switches ($M_1$, $M_2$, $M_3$, and $M_4$), four diodes ($D_1$, $D_2$, $D_3$, and $D_4$), and four capacitors ($C_1$, $C_2$, $C_3$, and $C_4$). The diodes $D_1$–$D_4$ and the capacitors $C_1$–$C_4$ are intrinsic elements of the MOSFET switches $M_1$–$M_4$. $L_r$ is a commutation inductor which is comprised of an external inductor plus the leakage inductor of the isolation transformer $T_r$. The capacitors $C_{a1}$ and $C_{a2}$ and the inductor $L_a$ form a commutation auxiliary circuit. The output stage is formed by rectifiers $D_{r1}$, and $D_{r2}$ and by an output filter formed by $L_r$ and $C_f$. $R_o$ is the load and $D_{c1}$, and $D_{c2}$, are clamping diodes.

In order to insure the commutation ZVS at a wide load range, it is necessary to have enough energy to charge and discharge the intrinsic capacitances $C_1$–$C_4$. The switches of the converter operate under different conditions of commutation. The commutation of the outer switches $M_1$ and $M_4$ always takes place when the current through the primary transformer is equal to the output current reflected to the primary. Since the filter inductance current reflected to the primary is large, even for small primary current, such as the transformer magnetizing current, it is sufficient to perform the commutation. On the other hand, the inner switches $M_1$ and $M_3$ commutate when the transformer is short-circuited by the output rectifier. Thus, it is necessary to use an auxiliary inductor $L_a$ to perform the commutation, since the resonant inductor $L_r$ alone does not provide enough stored energy.

As can be seen from above, one of the drawbacks that these prior art converters present is the use of the energy stored in the transformer leakage inductance to achieve zero voltage switching for two of the switches. Hence, an additional resonant inductance has to be included in order to assure ZVS for almost the entire load range. This in turn increases the circulating energy, which increases the conduction losses in the converter. In addition, both a reduction in the effective duty cycle and a severe secondary parasitic ringing occur.

SUMMARY OF THE INVENTION

It is therefore an object of the present invention to provide a Three-level (TL) DC-DC converter that overcomes the drawbacks presented by the Zero Voltage Switching (ZVS). Three-level converter, such as high circulating energy, severe parasitic ringing on the rectifier diodes, and limited ZVS load range for the inner switches.

According to the invention, a three-level DC-to-DC converter is provided having zero-voltage and zero-current switching (ZVZCS). A primary (input) stage and a secondary (output) stage are separated by an insolation transformer. Four commutation switches on the primary side are connected in cascade fashion and are switched by phase-shift control. An input dc voltage source is connected between the first and fourth switches. Two capacitors are also connected between the first and fourth commutation switches and function to split the input voltage in half. The primary side of the isolation transformer is connected at one end between the two capacitors and at its second end between the second and the third commutation switches. Two clamping diodes are also provided; one between the first and second switches and the two capacitors and the other between the third and fourth switches and the and the two capacitors. A flying capacitor is connected at one end between the first and second commutator switches and at a second end between the third and fourth commutator switches.

The output stage comprises two rectifiers connected to either end tap of the secondary side of the isolation transformer and an output filter comprising an a resistor and capacitor connected at one end to the rectifiers and at a second end to the center tap of the isolation transformer. An auxiliary voltage source is additionally added between the rectifiers and the center tap of the isolation transformer.

In operation, the positive and negative charges on the plates of the flying capacitor constantly switch sides and the as the first and second, and third and fourth commutation switches switch on and off. In this manner the primary side achieves Zero Voltage Switching (ZVS) for the outer commutation switches. The flying capacitor is an important element to achieve ZVS for the switches. This flying capacitor provides a trajectory for the current in order to charge and discharge the parasitic capacitance of the switches S1 and S2, respectively. Also, this flying, capacitor allows operation of the converter with a phase-shift control. Without this flying capacitor, the zero voltage operation would not be achieved since the outer switches would be turned on with ¼ of the input voltage.

In addition, during freewheeling (i.e., when no power is being transferred from the primary side to the secondary side), the auxiliary power source is switched on to provide a voltage which is reflected back to the primary side in order to eliminate the circulating energy and also to achieve Zero Current Switching (ZCS) for the commutation switches. Of course, the proposed converter would operate just with ZVS if the auxiliary voltage source is not provided.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
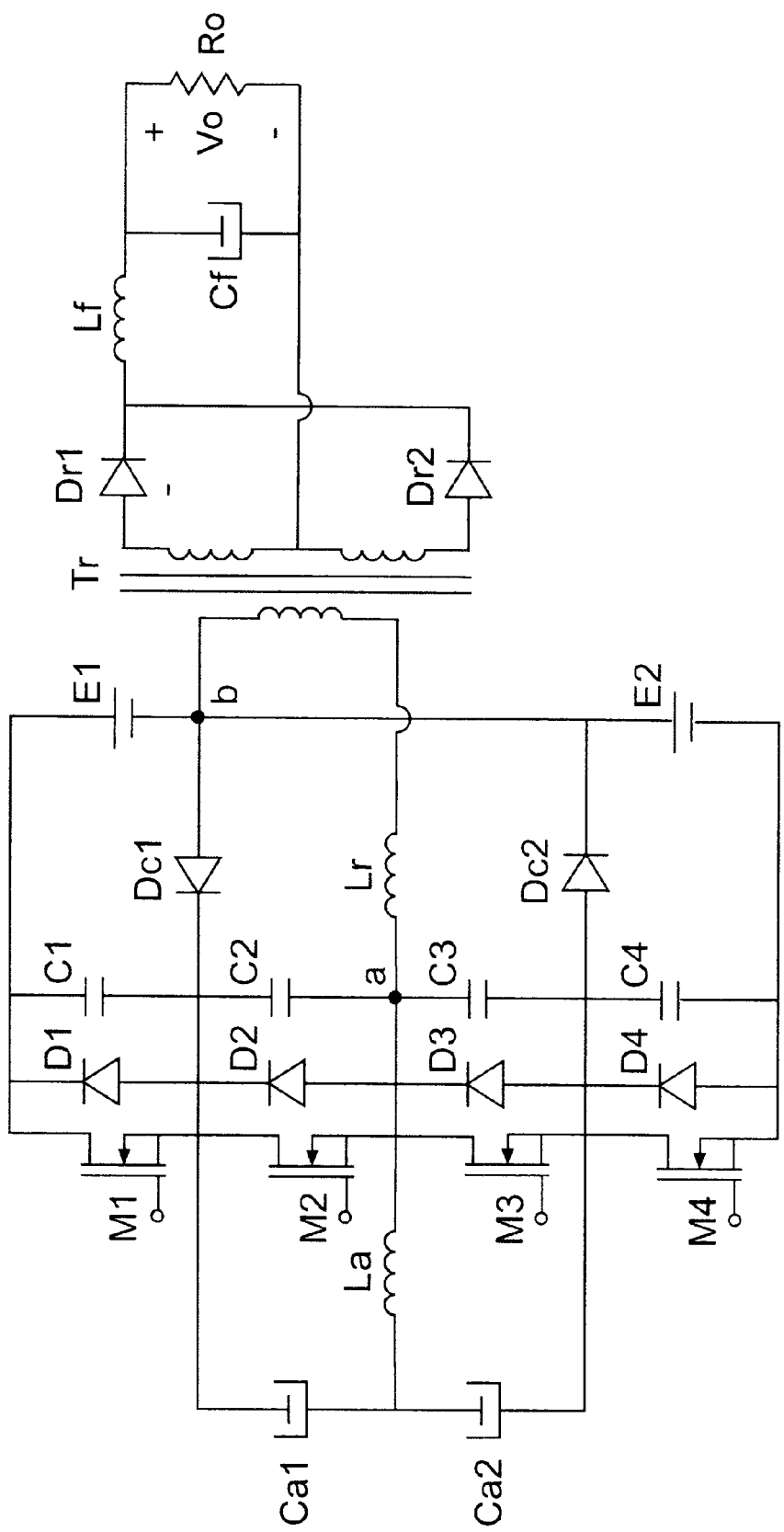
FIG. 1 is a circuit diagram of a prior art three-level DC-to-DC converter.
Figure 2A:
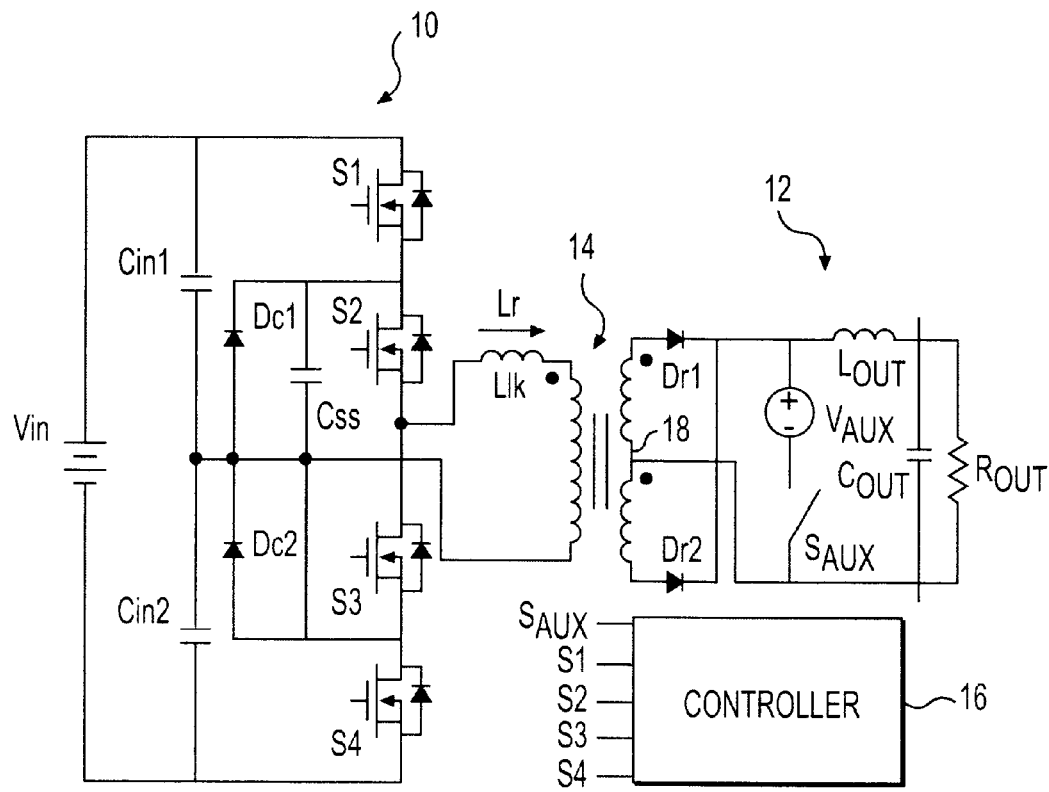
FIG. 2A is a circuit diagram of the three-level DC-to-DC converter having flying capacitor and auxiliary secondary side voltage source according to the present invention.

Referring now to the drawings, and more particularly to FIG. 2A, there is shown the proposed Zero Voltage and Zero Current Switching (ZVZCS) Three-Level Dc/Dc converter according to the present invention. The converter uses a phase shift control with a flying capacitor, Css, in the primary side to achieve Zero Voltage Switching (ZVS) for the outer switches. Additionally, the converter uses an auxiliary voltage source, Vaux, to reset the primary current during the freewheeling stage in order to eliminate the circulating energy and also to achieve Zero Current Switching for the inner switches.

A primary (input) side 10 and a secondary (output) side 12 are separated by an insolation transformer 14. Four commutation switches ($S_1$, $S_2$, $S_3$, and $S_4$) on the primary side 10 are connected in cascade fashion and are switched by phase-shift controller 16. An input de voltage source $V_{in}$ is connected between the first and fourth switches, $S_1$ and $S_4$. Two capacitors $C_{in1}$ and $C_{in2}$ are also connected between the first and fourth commutation switches, $S_1$ and $S_4$ and function to split the input voltage $V_{in}$ in half. The primary side of the isolation transformer 14 is connected at one end between the two capacitors, $C_{in1}$ and $C_{in2}$, and at its second end between the second and the third commutation switches, $S_2$ and $S_3$. Two clamping diodes, $D_{c1}$, and $D_{c2}$, are also provided. Dc1 is connected between the first and second switches ($S_1$ and $S_2$) and the two capacitors ($C_{in1}$ and $C_{in2}$). $D_{c2}$ is connected between the third an fourth switches ($S_3$ and $S_4$) and the and the two capacitors ($C_{in1}$ and $C_{in2}$). A flying capacitor $C_{ss}$ is connected at one end between the first and second commutator switches ($S_1$ and $S_2$) and at a second end between the third and fourth commutator switches ($S_3$ and $S_4$).

Figure 2B:
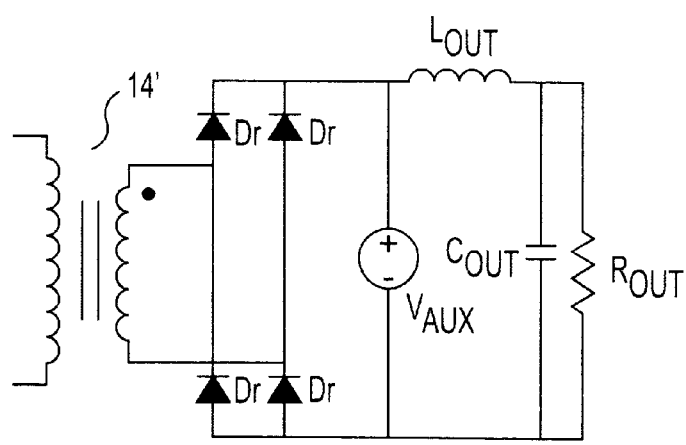
FIG. 2B is circuit diagram showing an alternate arrangement for the output stage shown in FIG. 2A.

The output stage 12 comprises two rectifiers, $D_{r1}$ and $D_{r2}$, connected to either end tap of the secondary side of the isolation transformer 14 and an output filter comprising an a capacitor $C_{out}$ and an inductor $L_{out}$ connected at one end to the rectifiers, $D_{r1}$ and $D_{r2}$, and at a second end to the center tap 18 of the isolation transformer 14. The output load is represented by $R_{out}$. An auxiliary voltage source $V_{aux}$ is additionally added between the rectifiers, $D_{r1}$ and $D_{r2}$ and the center tap 18 of the isolation transformer 14. FIG. 2B shows an alternate arrangement for the output stage using a non-center tapped transformer 14' and four rectifying diodes $D_r$.

The auxiliary voltage source $V_{aux}$ can be implemented in different ways. FIGS. 3A–D shows the implementation of the proposed converter with an auxiliary active circuit (3A), first and second Regenerative Snubbers (3B) and (3C), and a Saturable Reactor and capacitor (3D).

Figure 3A:
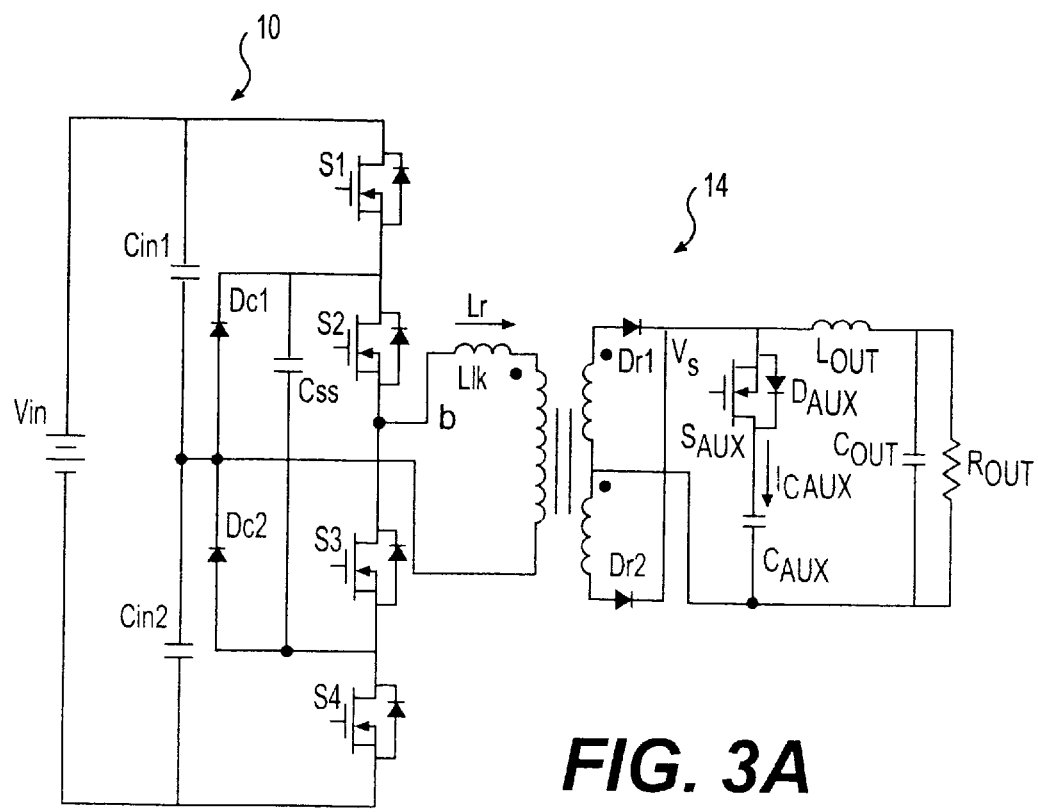
FIGS. 3A–3D are circuit diagrams of the three-level DC-to-DC converter shown in FIG. 2A where the alternate voltage source is realized by an auxiliary active circuit, first and second regenerative snubbers, and a saturable reactor and capacitor on the primary side, respectively.

In FIGS. 3A–D, like devices are given like reference numerals as those shown in FIG. 2A and therefore the detailed description is omitted. In FIG. 3A the auxiliary voltage source is shown as an active clamp comprising a clamp switch $S_{aux}$ and capacitor $C_{aux}$. The capacitor $C_{aux}$ stores a charge voltage which provides the auxiliary voltage source when the switch $S_{aux}$ is closed by the controller 16.

Figure 3B:
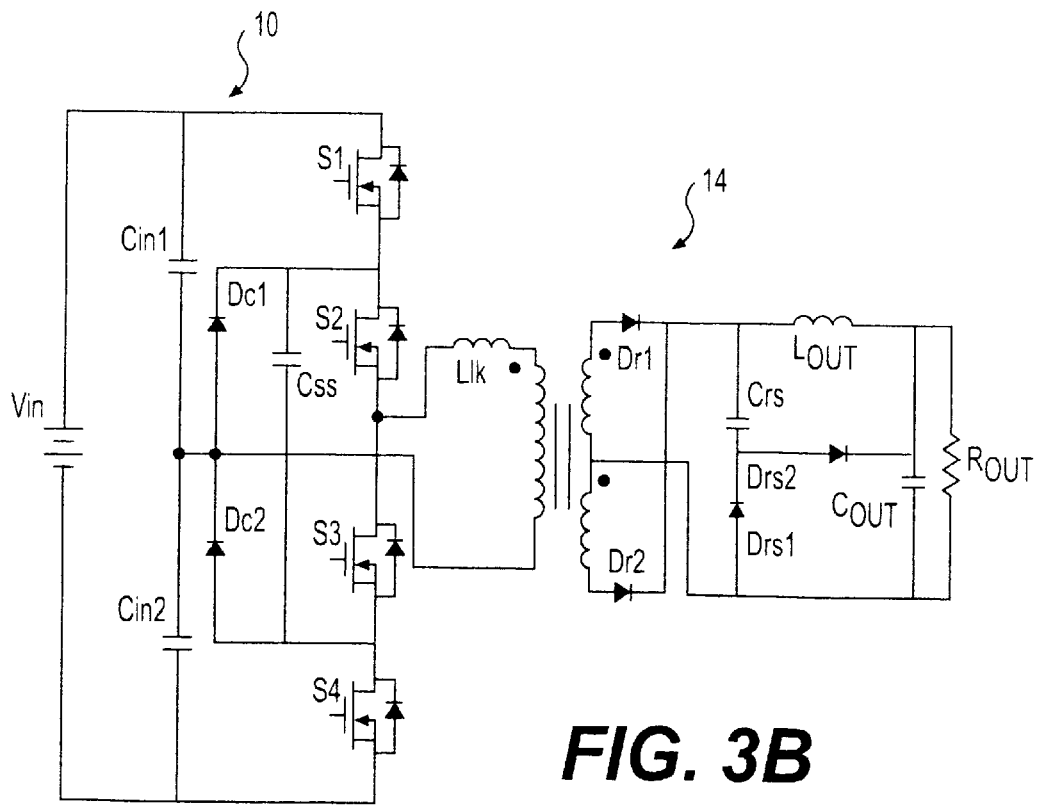

In FIG. 3B, the auxiliary voltage source $V_{aux}$ is provided by a regenerative snubber circuit comprising a capacitor $C_{rs}$ and two additional rectifier diodes $D_{rs1}$ and $D_{rs2}$. In the previous explanation, the primary current is reset by adding an auxiliary active circuit in the secondary side, which provides the necessary voltage source to reset the primary current during the freewheeling stage when $S_{aux}$ is turned on. In this way, the ZVZCS condition for the primary switches and the active clamping of the voltage across the secondary diodes are achieved.

In FIG. 3B, the auxiliary voltage source $V_{aux}$ is implemented with the capacitor $C_{rs}$ and the rectifiers $D_{rs1}$ and $D_{rs2}$. Its operating principle is similar to that one with the active auxiliary circuit. That is, when $S_1$ or $S_4$ is turned off, the capacitor $C_{rs}$ works as a temporary voltage source to reset the primary freewheeling current. That is, when $S_1$ is turned off the reflected filter inductor current charges the parasitic capacitance of $S_1$ and discharges the parasitic capacitance of $S_4$ through the auxiliary flying capacitor $C_{ss}$. This action continues until the rectifier voltage in the secondary equals the auxiliary capacitor voltage $V_{crs}$, and then $D_{aux2}$ is turned on. Then, a resonance between the leakage inductance and the parasitic capacitances of $S_1$ and $S_4$ takes place until the clamp diode $D_{c1}$ and the anti-parallel diode of the switch $S_4$ are turned on. During this time, the difference between the filter inductor current and the reflected leakage inductance current discharges $C_{rs}$. Once the anti-parallel diode of $S_4$ starts conducting, $S_4$ can be tamed on with zero voltage. The primary current freewheels through the clamp diode $D_{c1}$ and $S_2$. The voltage across the auxiliary capacitor is reflected to the primary and applied to the leakage inductance. In this way, the primary current is reduced to zero. Also, the auxiliary clamp capacitor supplies energy to the output. This action ends when the primary current is reset to zero. In this case, this temporary voltage source is not controllable, which means that in every half period, the energy in the capacitor $C_{rs}$ is discharged completely. Moreover, during the transition from the freewheeling stage to the active stage, these sources are reestablished in a resonant fashion trough the auxiliary diode $D_{rs1}$.

Figure 3C:
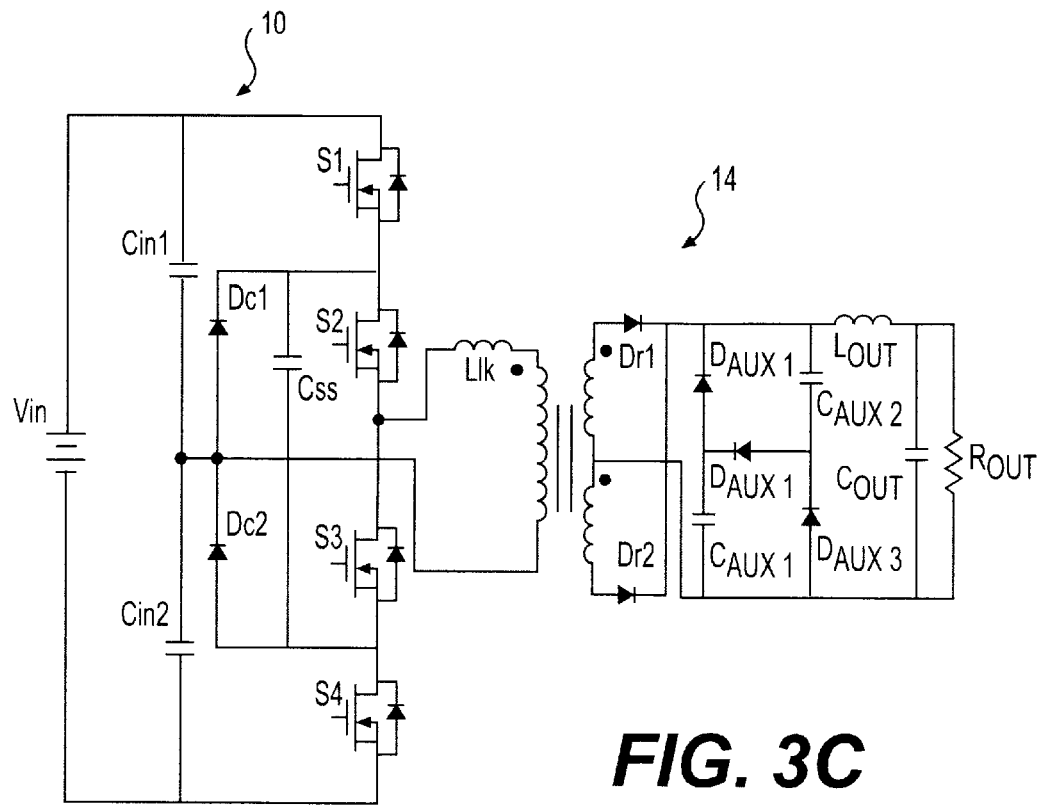

In FIG. 3C, the auxiliary circuit $V_{aux}$ is also provided by a regenerative snubber comprising two auxiliary capacitors $C_{aux1}$ and $C_{aux2}$ and auxiliary diodes $D_{aux1-3}$. In FIG. 3C, the auxiliary voltage source needed to reset the current during the freewheeling stage is also provided by a passive lossless circuit comprising two auxiliary capacitors $C_{aux1}$ and $C_{aux2}$, and three auxiliaries diodes $D_{aux1}$, $D_{aux2}$, and $D_{aux3}$. its operating principle is similar to the two previous described circuits. That is, when $S_1$ or $S_4$ is turned off, the capacitors $C_{aux1}$ and $C_{aux2}$ work as a temporary voltage source to reset the primary freewheeling current. Similarly to the previous case, when the lossless circuit is used, this temporary sources are not controllable, which means that in every half period, the snubber capacitors energy is discharged completely. Moreover, during the transition from the freewheeling stage to the active stage, these sources are reestablished in a resonant fashion.

Figure 3D:
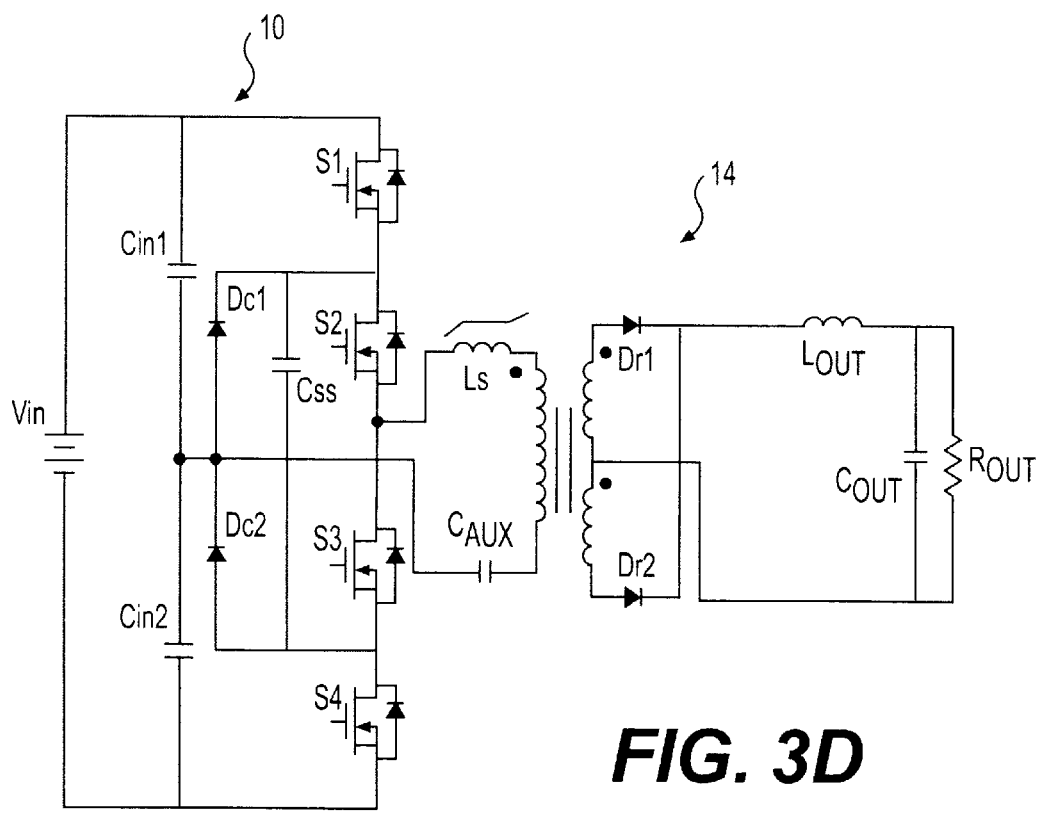
Figure 4A:
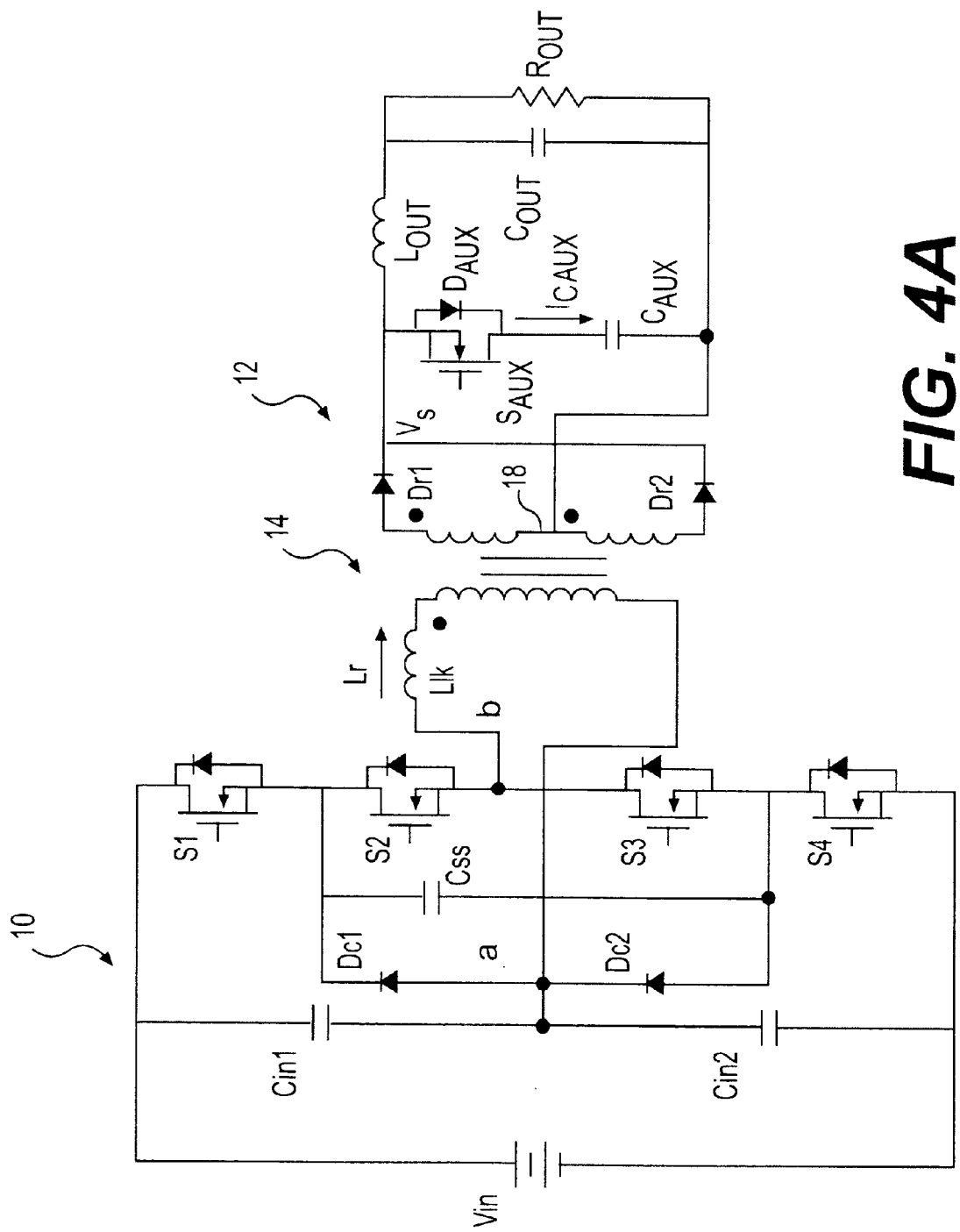
FIGS. 4A–4B are the circuit diagram of the three-level DC-to-DC converter according to the present invention along with its principle waveform diagram, respectively.
Figure 4B:
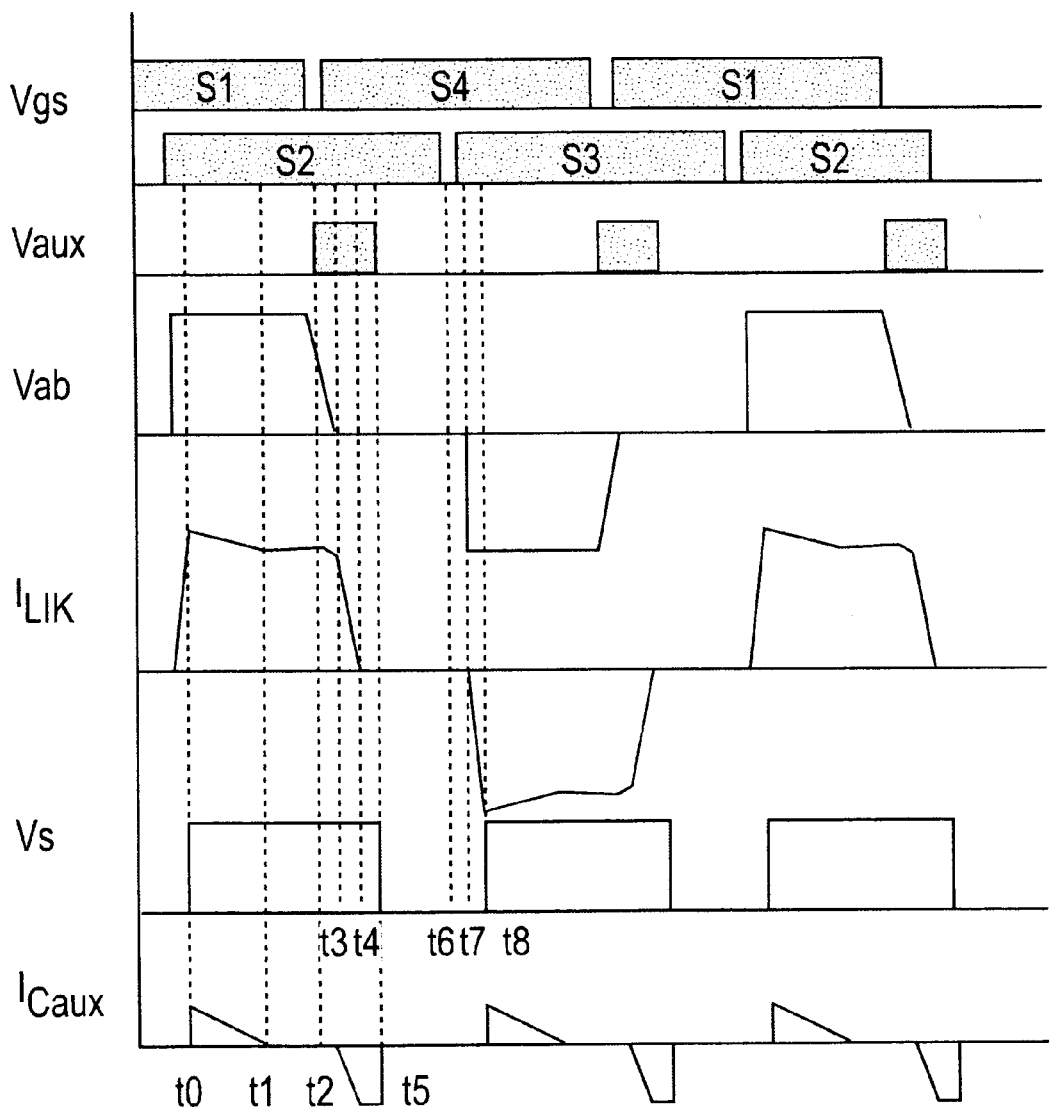

In FIG. 3D, the auxiliary voltage source is provided by a saturable inductor $L_s$ on the primary side 10. FIG. 3D shows the ZVZCS Three-Level DC/DC converter using an auxiliary voltage source in the primary side. This auxiliary voltage source to achieve ZCS operation is implemented with a capacitor and a saturable inductor. If the capacitance is very low, the voltage level across it can be high enough to reset the primary current. Meanwhile, the saturable inductor is used to keep the current at zero during the freewheeling stage.

Referring to FIGS. 4A–D, and operational example is given for the case when the auxiliary voltage source is an active clamp circuit. In order to simplify the analysis of the converter, it is assumed that the circuit operation is in steady state, the output filter inductor $L_{out}$ is large enough to be considered as a current source, all the devices are ideal, and the transformer magnetizing current is neglected.

The proposed converter has eight operation stages during a half switching cycle. As it was mentioned before, the circuit uses the well known phase shift control with turn on and turn off of nearly 50% duty cycle. The phase shift between $S_1$ and $S_2$ or $S_3$ and $S_4$ determines the operating duty cycle of the converter. The following explains the operation the circuit shown in FIG. 4A with reference to FIG. 4B.

[t0–t1]: During this stage, $S_1$ and $S_2$ are conducting and the input power is delivered to the output. At the beginning of this stage, the anti-parallel diode $D_{aux}$ of the clamp switch $S_{aux}$ starts to conduct the resonant current between the leakage inductance, $L_{lk}$, and the junction capacitance of the output rectifier diodes $D_{r1}$ and $D_{r2}$ This stage ends at t1 when the current $I_{aux}$ through the clamp capacitor, $C_{aux}$, reaches zero. The duration of this mode depends on the leakage inductance, the junction capacitance and the reverse recovery time of the rectifier diodes $D_{r1}$ and $D_{r2}$.

[t1–t2]: In this stage, the input power continues delivering to the output. At t1, the current in the clamp capacitor $C_{aux}$ reverses its polarity but the anti-parallel diode $D_{aux}$ of the clamp switch $S_{aux}$ blocks and the voltage across the secondary rectifier becomes:

$$V_{rec} = \frac{V_{in}}{n}$$

[t2–t3]: At t2, $S_1$ is turned off and the load current charges and discharges the parasitic capacitance of S1 and S4 through the flying capacitor, $C_{ss}$ respectively. Meanwhile, the clamp switch $S_{aux}$ is turned on and the secondary voltage is held by the clamp capacitor, $C_{aux}$. This stage ends when the voltage across the parasitic capacitance of S1 reaches Vin/2 and the clamp diode $D_{c1}$ begins to conduct. At the same time, the voltage across the parasitic capacitance of $S_4$ reaches zero and its antiparallel diode, $D_4$, begins to conduct.

[t3–t4]: After $D_4$ starts conducting, $S_4$ can be turned on at t3 with ZVS. The primary current freewheels through the clamp diode, $D_{c1}$, and $S_2$. The auxiliary clamp capacitor $C_{aux}$ voltage is reflected to the primary side 10 and applied across the leakage inductance $L_{lk}$. In this way, the primary current is reduced linearly to zero with a slope equal to $V_{Caux}*n/L_{lk}$ (where n is the turn ration of the transformer 14). Also, the auxiliary clamp capacitor $C_{aux}$ supplies energy to the output. This stage ends when the primary current is reset to zero.

[t4–t5]: The rectifier diodes $D_{r1}$ and $D_{r2}$ are turned off since the primary current is zero and $S_{aux}$ is still on. During this stage, the output current still is supplied by the auxiliary clamp capacitor $C_{aux}$. As a result, the effective duty cycle seen in the secondary side is larger than the one seen in the primary side.

[t5–t6]: At t5, $S_{aux}$ is turned off, the voltage applied to the output rectifiers $D_{r1}$ and $D_{r2}$. immediately drops to zero, and the conventional freewheeling stage in the converter starts. During this time, there is no current freewheeling in the primary side. Therefore, the circulating energy in the primary side is reduced due to ZVZCS operation.

[t6–t7]: At t6, $S_2$ is turned off with complete ZCS since the leakage current has been reset completely at t4. As a consequence, IGBTs can be used for $S_2$ and $S_3$.

[t7–t8]: At t8, $S_3$ is turned on and the primary voltage is applied to the primary side of the transformer. The primary current flows through $S_3$ and $S_4$ and begins to increase with a slope equal to $V_{in}/(2*L_{lk})$. At the end of this stage, the primary current reaches the reflected output current and a new half-switching cycle starts.

As can be seen from the above description, the present invention provides a novel Zero Voltage and Zero Current Switching (ZVZCS) Three-level (TL) DC/DC converter providing a reduction of the voltage stress across the power switch Lip to half the input voltage and an improvement in the efficiency by reducing the circulating energy in the converter during the freewheeling stage. Therefore, this converter can be used in applications where are needed high voltage and high power, such as the one used for telecommunication, battery charger and uninterruptible power supplies with a power factor pre-regulator.

While the invention has been described in terms of a single preferred embodiment, those skilled in the art will recognize that the invention can be practiced with modification within the spirit and scope of the appended claims.

We claim:

1. A DC-to-DC power converter, comprising:
    an input stage and an output stage;
    a transformer connecting said input stage and said output stage; said input stage comprising:

a positive input terminal and a negative input terminal for connection to a DC power source:

a first pair of switches connected between said positive input terminal and a first end tap of a primary side of said transformer;

a second pair of switches connected between said negative input terminal and said first end tap of said primary side of said transformer;

a pair of capacitors connecting a second end tap of said primary side of said transformer to said positive input terminal and a negative input terminal, respectively; and a capacitor connected between said first pair of switches and said second pair of switches;

said output stage comprising:

a rectifier circuit connected to a secondary side of said transformer;

an output filter connected to said rectifier; and an auxiliary voltage source connected to said rectifier circuit.

2. A DC-to-DC power converter as recited in claim 1, further comprising a pair of diodes connected between said capacitor and a node connecting said pair of capacitors.

3. A DC-to-DC power converter as recited in claim 1 wherein said auxiliary voltage source comprises an auxiliary active clamp circuit.

4. A DC-to-DC power converter as recited in claim 1 wherein said auxiliary voltage source comprises a regenerative snubber circuit.

5. A DC-to-DC power converter, comprising:

an input stag,e and an output stage;

a transformer connecting said input stage and said output stage; said input stage comprising:

a positive input terminal and a negative input terminal for connection to a DC power source;

a first pair of switches connected between said positive input terminal and a first end tap of a primary side of said transformer;

a second pair of switches connected between said negative input terminal and said first end tap of said primary side of said transformer;

a pair of capacitors connecting a second end tap of said primary side of said transformer to said positive input terminal and a negative input terminal, respectively;

a capacitor connected between said first pair of switches and said second pair of switches; and an auxiliary voltage circuit connected to said first and said second end taps of said transformer;

said output stage comprising:

a rectifier circuit connected to a secondary side of said transformer;

an output filter connected to said rectifier.

6. A DC-to-DC power converter as recited in claim 5 wherein said auxiliary voltage source comprises a saturable reactor and capacitor.

7. A zero-voltage, zero-current switching (ZVZCS) DC-to-DC power converter comprising:

an input stage and an output stage connected by a transformer;

a plurality of switches connected in cascade for connecting and disconnecting a DC input power source to and from said transformer;

a capacitor connected across ones of said plurality of switches to charge and discharge switch capacitance to achieve zero-voltage switching; and an auxiliary voltage source activated during a freewheeling cycle when no power is being transferred from the input stage to the output stage, said auxiliary power source providing an auxiliary voltage to eliminate the circulating energy in said input stage to achieve zero current switching (ZCS).

8. A zero-voltage, zero-current switching (ZVZCS) DC-to-DC power converter as recited in claim 7 wherein said auxiliary voltage source is connected within said output stage and said auxiliary voltage is reflected back through said transformer to said input side.

9. A zero-voltage, zero-current switching (ZVZCS) DC-to-DC power converter as recited in claim 8 wherein said auxiliary voltage source is a regenerative snubber circuit.

10. A zero-voltage, zero-current switching (ZVZCS) DC-to-DC power converter as recited in claim 7 wherein said auxiliary voltage source is a saturable reactor and a capacitor connected to said transformer within said input stage.

* * * * *